US012764227B1

(12) United States Patent
Williams et al.

(10) Patent No.: US 12,764,227 B1
(45) Date of Patent: Oct. 13, 2026

(54) SYSTEM AND METHOD FOR DYNAMIC COMMUNICATION EXPERIENCES

(71) Applicant: UIPCO, LLC, San Antonio, TX (US)

(72) Inventors: Kristopher Thomas Williams, Helotes, TX (US); Nikhil Dama, Apex, NC (US); David Patrick Dixon, Boerne, TX (US); Jess W. Gingrich, San Antonio, TX (US); Arthur Eugene Cutter, IV, Colorado Springs, CO (US); Surender Kumar, Palatine, IL (US)

(73) Assignee: United Services Automobile Association (USAA), San Antonio, TX (US)

( * ) Notice: Subject to any disclaimer, the term of this patent is extended or adjusted under 35 U.S.C. 154(b) by 216 days.

(21) Appl. No.: 18/619,687

(22) Filed: Mar. 28, 2024

Related U.S. Application Data

(60) Provisional application No. 63/493,357, filed on Mar. 31, 2023.

(51) Int. Cl.
*H04M 3/493* (2006.01)
*G06T 7/00* (2017.01)
*H04M 3/53* (2006.01)

(52) U.S. Cl.
CPC ............. *H04M 3/493* (2013.01); *G06T 7/001* (2013.01); *H04M 3/5315* (2013.01)

(58) Field of Classification Search
CPC ...... H04M 3/493; H04M 3/5315; G06T 7/001
USPC ........................................................ 379/88.18
See application file for complete search history.

(56) References Cited

U.S. PATENT DOCUMENTS

| | | | | |
|---|---|---|---|---|
| 9,325,845 | B2 * | 4/2016 | Nguyen | H04L 67/146 |
| 9,743,045 | B2 * | 8/2017 | Lin | H04N 7/142 |
| 2008/0147406 | A1 * | 6/2008 | Da Palma | H04L 51/02<br>704/E15.04 |
| 2015/0095453 | A1 * | 4/2015 | Jain | H04M 3/567<br>709/217 |
| 2016/0314546 | A1 * | 10/2016 | Malnati | H04W 4/021 |
| 2018/0084111 | A1 * | 3/2018 | Pirat | H04L 51/04 |
| 2022/0337780 | A1 * | 10/2022 | Huang | G02B 27/0093 |
| 2024/0104870 | A1 * | 3/2024 | Fuste Lleixa | G06F 3/04842 |

* cited by examiner

*Primary Examiner* — Binh Kien Tieu
(74) *Attorney, Agent, or Firm* — Plumsea Law Group, LLC

(57) ABSTRACT

A method and system of automatically transitioning management of a communication session from a voice-based interface to a video-based interface is disclosed. The system identifies whether the user has provided an input to an interactive voice response (IVR) system that indicates their intention of submitting data that is visual. This context will be used by an artificial intelligence (AI) system to determine if there should be a switch made from the IVR system to a video-call medium. In some examples, once the switch has occurred, the AI system can also grade the image quality of the received video data and generate feedback to the user to ensure submission of images with acceptable quality.

20 Claims, 10 Drawing Sheets

SYSTEM AND METHOD FOR DYNAMIC COMMUNICATION EXPERIENCES

CROSS-REFERENCE TO RELATED APPLICATION

This application claims the benefit of U.S. Provisional Patent Application Ser. No. 63/493,357 filed on Mar. 31, 2023 and titled "System and Method for Dynamic Communication Experiences", the disclosure of which is incorporated by reference herein in its entirety.

TECHNICAL FIELD

The embodiments relate generally to methods and systems for modifying a communication interface for a user, and specifically to automatically switching a communication session between an end-user and a service provider audio from an audio-based exchange to a video call based on real-time contextual data.

BACKGROUND

Interactive Voice Response (IVR) is a telephony technology that allows a user to navigate through a series of prompts and responses using keypad input or voice response commands. Over the years, there has been widespread adoption of IVR systems, especially in businesses that handle large volumes of incoming calls. The size of known IVR systems range from small to large, and their abilities from simple to complex. In recent years, IVR processes have become more sophisticated, irrespective of their size or complexity, which in some cases has resulted in a corresponding improvement in user experience.

In general, a Computer Telephone Integration (CTI) system is used to identify the Calling Line ID (CLI) of an inbound call. The inbound call is then routed to an IVR system, which in some cases can use the CLI to identify the customer for profile-directed service tailoring. The IVR system queries the customer with a digitally recorded set of questions and the customer's responses are then used to ascertain the appropriate routing for the call. In addition, some IVR systems utilize complex algorithms to determine the most appropriate routing of the call. Once a destination has been determined, the CTI system passes the routing for the call to an Automated Call Distributor (ACD), which in turn connects the customer with the intended recipient or customer hold queue.

While IVR systems typically enhance the customer service experience, they are not without their limitations. While many IVR systems routinely store customer information in a buffer or cache for call routing completion, this information is generally lost upon call termination and is unavailable when a customer re-establishes their connection with the IVR system. In addition, customers seeking to engage in a richer exchange of information are typically limited by the type of data that can be submitted via telephone. While there have been various sophisticated methods developed by electronic content providers to enhance the user's communication experience, users have not been provided with dynamic interface modalities based on the context of a given user's call.

There is a need in the art for a system and method that addresses the shortcomings discussed above.

SUMMARY

In one aspect, a method of dynamically transitioning between communication modalities during a communication session with an end-user is disclosed. The method includes a first step of receiving, at an artificial intelligence (AI) system and from an interactive voice response (IVR) system, a first input by the end-user from a user computing device during a first interaction of the communication session, the first interaction occurring between the end-user and the IVR system. A second step includes identifying, at the AI system and based on the first input, a first context for the first interaction. In addition, a third step includes automatically triggering, at the AI system and in response to the identification of the first context, a transition of management of the communication session from the IVR system to a video-based communication interface of the AI system. A fifth step includes capturing, by the AI system, first video data associated with the end-user from the user computing device during a second interaction occurring between the end-user and the AI system.

In another aspect, dynamically transitioning between communication modalities during a communication session with an end-user is disclosed. The method includes a first step of receiving, at an artificial intelligence (AI) system, first video data associated with the end-user from a user computing device during a first interaction of the communication session, a second step of determining, at the AI system, that the first interaction has been successfully completed, and a third step of automatically reverting management of the communication session to an interactive voice response (IVR) system in response to determining the first interaction has been successfully completed. Thus, the AI system causes a switch from a first modality (video interface) to a second modality (IVR interface), thereby changing the medium in which the content is being presented and/or received by the computing device.

In another aspect, a system is disclosed for dynamically transitioning between communication modalities during a communication session with an end-user is disclosed. The system comprises a processor and machine-readable media including instructions which, when executed by the processor, cause the processor to (1) receive, at an artificial intelligence (AI) system and from an interactive voice response (IVR) system, a first input by the end-user from a user computing device during a first interaction of the communication session, the first interaction occurring between the end-user and the IVR system; (2) identify, at the AI system and based on the first input, a first context for the first interaction; (3) automatically trigger, at the AI system and in response to the identification of the first context, a transition of management of the communication session from the IVR system to a video-based communication interface of the AI system; and (4) capture, by the AI system, first video data associated with the end-user from the user computing device during a second interaction occurring between the end-user and the AI system.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
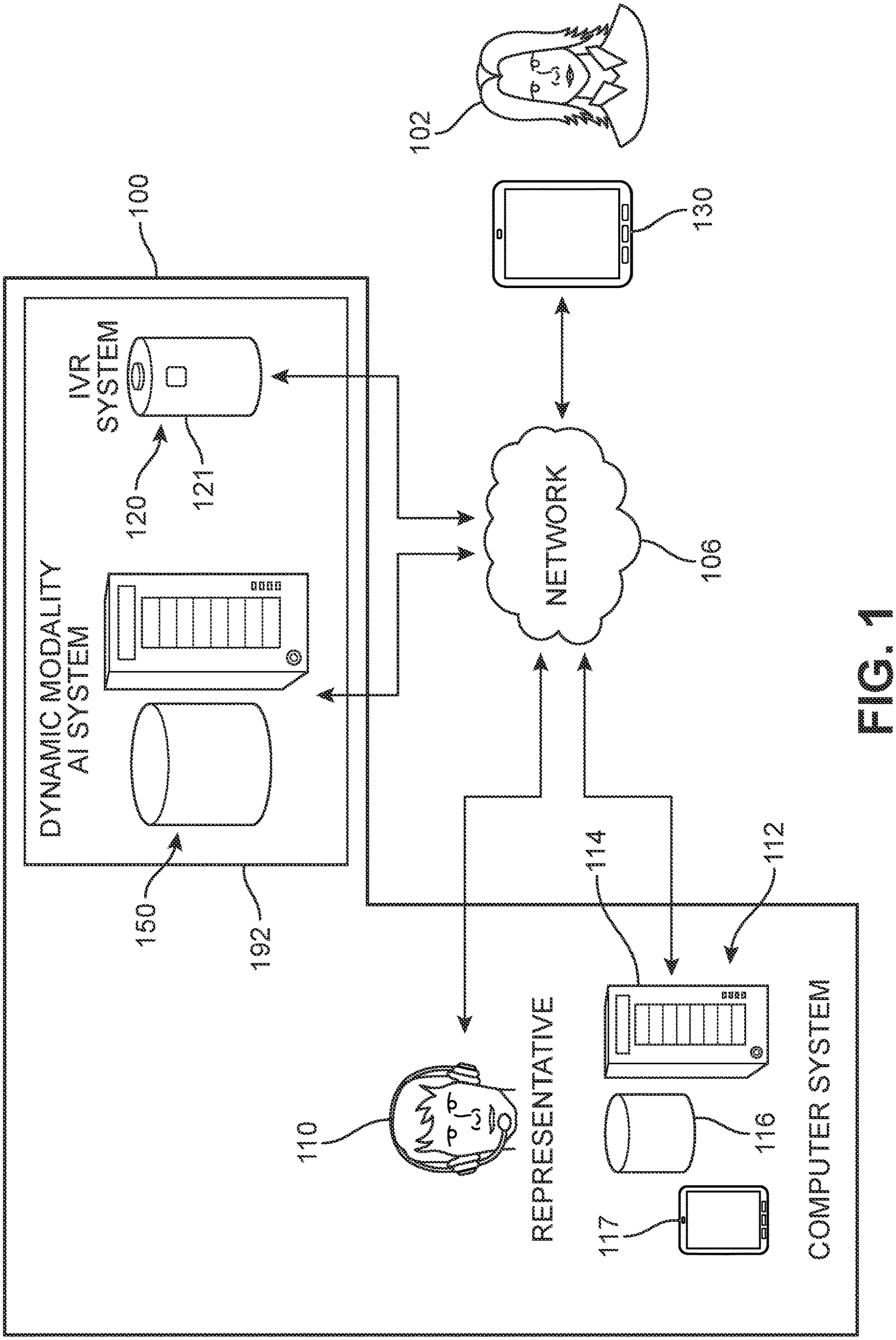
FIG. 1 is a schematic view of systems for facilitating communication between a user and a service representative, according to an embodiment.

The embodiments provide a system and method for enabling dynamic transitions between different user interface experiences during a communication session. In one example, the system provides an IVR (Interactive Voice Response)-based communication session that automatically transitions to a video-based call when the system determines such a change would best serve the needs of the end-user. The proposed embodiments can help customers, members and other users of a service to accomplish various tasks in a manner that improves user satisfaction. As one non-limiting example, a user may wish to provide information to an entity such as an insurer or financial institution. This system can, for example, allow users to submit important claims information without requiring the user to manually switch between one communication session using IVR to another using video.

The proposed systems and methods are configured to implement artificial intelligence (AI) techniques to determine which mode of communication would best facilitate the exchange of data. Once that determination is made, an AI system could ask the user if the session can be switched to a video session. In some embodiments, the video call would be set to film using the outwardly (rear) facing camera so the member could use their phone screen as the camera viewfinder. In cases of insurance claim submissions, during a video session, the AI system may ask the member to shoot video of the incident or damage. For example, if the member has previously indicated that a tree branch has fallen on their house, the AI system could direct the member to shoot video of the tree branch on the house from the outside, then also direct the member to shoot video of the damage caused by the branch to the interior of the house, if this can be done safely.

In one example, the AI system can also ask the member to describe what happened in their own words as the system records their video testimony. In different embodiments, the AI system is configured to process and "watch" user created video and provide guidance to the user to improve video quality. In some embodiments, the system can ask the member to shoot the video more steadily or to move the phone more slowly. In other words, if the quality of the video is degraded by rapid or uneven movement of the phone, the AI system can detect this and ask the member to hold the phone steady. In some embodiments, this system would allow members to rapidly submit important claims information to their insurer or other entity using an IVR system that would avoid the frustrations of conventional and static IVR interactions.

In another embodiment, an IVR-based intelligent voice assistant can provide enhanced assistance during a call between a user and a service representative. Specifically, the intelligent voice assistant can determine when a user is attempting to submit information with an observable or visual element to the automated representative and automatically switch the user to video call or recording mode. By providing enhanced assistance during a call between a user and a virtual service representative, the system and method can allow the user to provide the service provider with information of a different medium or format during a single, uninterrupted communication session.

The embodiments make use of methods and systems in artificial intelligence. As used herein, "artificial intelligence" may include any known methods in machine learning and related fields. As examples, artificial intelligence may include systems and methods used in natural language processing (NLP). As used herein, the term "user", "customer", and/or "member" should be understood to refer to any end-user or person accessing an application configured with some or all of the features described herein. In addition, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" or "triggering event", as noted above, refers to an event (or specific sequence of events) associated with a particular input or use of an application via an interface, which can trigger a change in the application.

Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In addition, graphical user interfaces (GUIs) can be used to present information to a user in the form of icons, graphics, or other types of interactive elements. Such interactive elements are generally associated with a particular action or command. A user typically has to supply an input to a computing system that is associated with the interactive elements presented on the graphical user interface to execute the particular action or command. As used herein, "interactive element" broadly includes a wide variety of graphical tools or components, such as graphical icons, graphical menus, graphical buttons, hyperlinks, images, and any other element which can be displayed on a graphical display and associated with or otherwise linked to an action or process that is to be performed upon activation of an interactive element.

The term "configuration", "medium", or "modality" refer to the variable feature management and configuration services for use with web and mobile applications, microservices, and distributed environments. A change in configuration of an application or system can alter the available resources, settings, operation, and behavior of the app. Depending on the app and its purpose, the available modalities may vary. A triggering event refers to an event or sequence of events that matches a pre-selected condition and will cause a change in the user experience mode (app configuration) to be implemented, enabled, activated, implemented, and/or initiated. More specifically, for purposes of this application, the manner in which the content is (a) presented and/or (b) can be interacted with refers to the app content's modality. Various types of modalities will be discussed in greater detail below.

Referring now to FIG. 1, for purposes of introduction, a schematic view of some of the systems, components and devices that may be used to facilitate interactions between a service provider environment 100 and a user 102 of the customer service system. Service provider environment 100 may be a company or any other organization that provides services to users. In one embodiment, service provider environment 100 could be a bank. In another embodiment, service provider environment 100 could be an insurance company. In another embodiment, service provider environment 100 could be a company that provides banking services and insurance services as well as other kinds of services. User 102 could be a customer, or member, or could any other user of services provided by service provider environment 100.

To facilitate interactions with customers, members or general users of its services, service provider environment 100 may optionally include at least one human service representative 110. As used herein, the term "service representative" (or simply, "representative") refers to any individual or virtual agent operating in a capacity to represent a service provider in interactions with a customer or user. The representative could be, for example, an employee at a call center. However, in different embodiments, no human service representative is needed for the benefits of the proposed systems to be implemented.

A representative could operate within a larger customer service system (or department) of service provider environment 100. For example, a bank could provide a customer service system that allows users to speak with representatives to help them obtain their account balances, pay bills, apply for and/or discuss loans, transfer money between accounts, wire money, get access to online services, troubleshoot technical problems associated with the bank's website, ask questions about forms and documents, as well as to help with any other suitable needs a user (or customer) might have. As another example, an insurance company could provide a customer service system that allows users to speak with representatives to help them with insurance policies and claims, as well as to help with any other suitable needs a user (or customer) might have.

Service provider environment 100 is also comprised of at least one computer system 112. The term "computer system" refers to the computing resources of a single computer, the partial computing resources of a single computer, a plurality of computers communicating with one another, or a network of remote servers. In one embodiment, computer system 112 includes at least one server. In the embodiment of FIG. 1, computer system 112 comprises one or more computing devices 114 (for example, a server) that may be in communication with one or more databases 116. Databases 116 could be co-located with computing devices 114 or could be remote databases that are accessible by computing devices 114 over a network. Databases 116 can include any kind of storage devices, including but not limited magnetic, optical, magneto-optical, and/or memory, including volatile memory and non-volatile memory. As will be discussed in greater detail below, service provider environment 100 can further comprise an IVR system 120 and a dynamic modality AI system ("AI system") 150, collectively referred to as an artificial, intelligent computer telephony integration system ("communication system") 192.

In some embodiments, representative 110 may have access to a device of computer system 112. In the exemplary embodiment of FIG. 1, representative 110 may have access to representative device 117. In FIG. 1, representative device 117 is depicted as a mobile computing device, such as a smartphone or tablet computer. In other embodiments, representative device 117 could be a desktop computer, a laptop computer or any other kind of computing device. Using representative device 117, representative 110 may be able to review user records, communicate with user 102, receive information from other components of the service provider environment 100, send documents and forms to a user and/or perform other tasks required to help the user.

User 102 may have access to a user device 130. In the exemplary embodiment of FIG. 1, user device 130 comprises a mobile device. For example, user device 130 could be a smartphone or a tablet computer. In other embodiments, however, a user device could comprise a tablet, a laptop, a desktop computer, or similar kind of device.

Both representative device 117 and user device 130 may comprise computer systems for processing and communicating information. Each device may generally include a processor, a data storage component and a display. Each device may also include components to facilitate communication with external systems (for example, hardware and software components to enable communication over a network). In some cases, a device includes one or more input devices. These could include a keyboard, mouse, or one or more physical buttons integrated into a case of the device. In some cases, a device includes touchscreen controls.

In different embodiments, user device 130 could operate in a client-server relationship with one or more servers of computer system 112. For example, computer system 112 may include a server that communicates with user device 130 as well as other remote devices over network 106. User device 130 may provide the front-end of a system that provides users with options for performing various kinds of tasks (for example, making fund transfers when the company is a bank). In some cases, user device 130 may run client software through a web browser, in which case the client software may be hosted on a server associated with computer system 112. In other cases, user device 130 may run client software in the form of a native software application that has been downloaded through a centralized marketplace (i.e., an "app store"). In some cases, while the client software that allows users to perform various tasks may be run on user device 130, the data may be retrieved from and stored on databases associated with computer system 112.

In different embodiments, various users of the service provider environment 100 and, more specifically, of the components of the communication system 192, are provided access to an IVR system 120. The IVR system 120 may comprise at least one processor and storage 121 (computer memory), one or more speakers and one or more microphones. Speakers may be used to produce audible information (that is, words and other sounds). Microphones may receive audible information (that is, words and other sounds). The IVR system 120 may also include components to facilitate communication with external systems (for example, hardware and software components to enable communication over network 106). In various embodiments, when the service provider system 100 receives a call from or makes a call to a user, call processing is implemented with a computer telephony integration (CTI) system within the IVR system 120. In some embodiments, an inbound call can be received from the user 102 by the CTI system, which comprises the IVR system 120. The CTI module further comprises a call processing module and call processing information.

Furthermore, in different embodiments, the communication system 192 includes and enables functionality of an intelligent dynamic modality via the AI system 150. The AI system 150 may include one or more software and/or hardware modules that facilitate various kinds of interactions with a user, including some of the interactions described above. For example, AI system 150 may include a voice module that controls general speech functionality, such as voice recognition and speech generation. The AI system 150 may make use of any techniques in the field of machine learning or artificial intelligence for facilitating verbal communication with a user. In some embodiments, AI system 150 could include software making use of natural language processing to process incoming sounds (such as words), interpret the input, and produce audible responses (such as words). More specifically, AI system 150 could use speech recognition algorithms to process incoming speech, natural language understanding algorithms to determine the content of the speech, and natural language generation algorithms to produce speech that can be understood by a user.

In some embodiments, AI system 150 can include both a local computing device and a remote computing system. AI system 150 may provide some of the intelligence and functionality of an intelligent assistant that is accessible over a network, such as the internet. For example, in some embodiments computing device 121 for IVR system 120 could receive audio information and send that audio information to AI system 150 (over network 106) for processing. The results of processing the audio information may then be returned to computing device 121 to be spoken to a user. In some other embodiments, some or all of the provisions of AI system 150 could be incorporated locally into computing device 121.

As will be described herein, the AI system 150 is configured to automatically and seamlessly transition the user from one type of interface and/or communication interface type (modality) to another in response to recognition of the user's needs or requests during a single communication session. This allows the user to continue to benefit from the features provided by the IVR system while also accommodating their specific needs in the moment, without requiring the user to seek out alternative access portals or interfaces. In different embodiments, AI system 150 may be configured with one or more software applications or "apps". In some cases, these software applications may be acquired through an online application store and downloaded to user device 130. Thus, the AI system 150, though shown as residing remotely from the user device 130 in FIG. 1, can also be provided and accessed locally on the user device 130. These applications may be stored locally using storage of user device 130 and run using the at least one processor. These applications may use an application program interface to control various onboard components of user device 130, such as speakers, microphones, and voice module.

Figure 2:
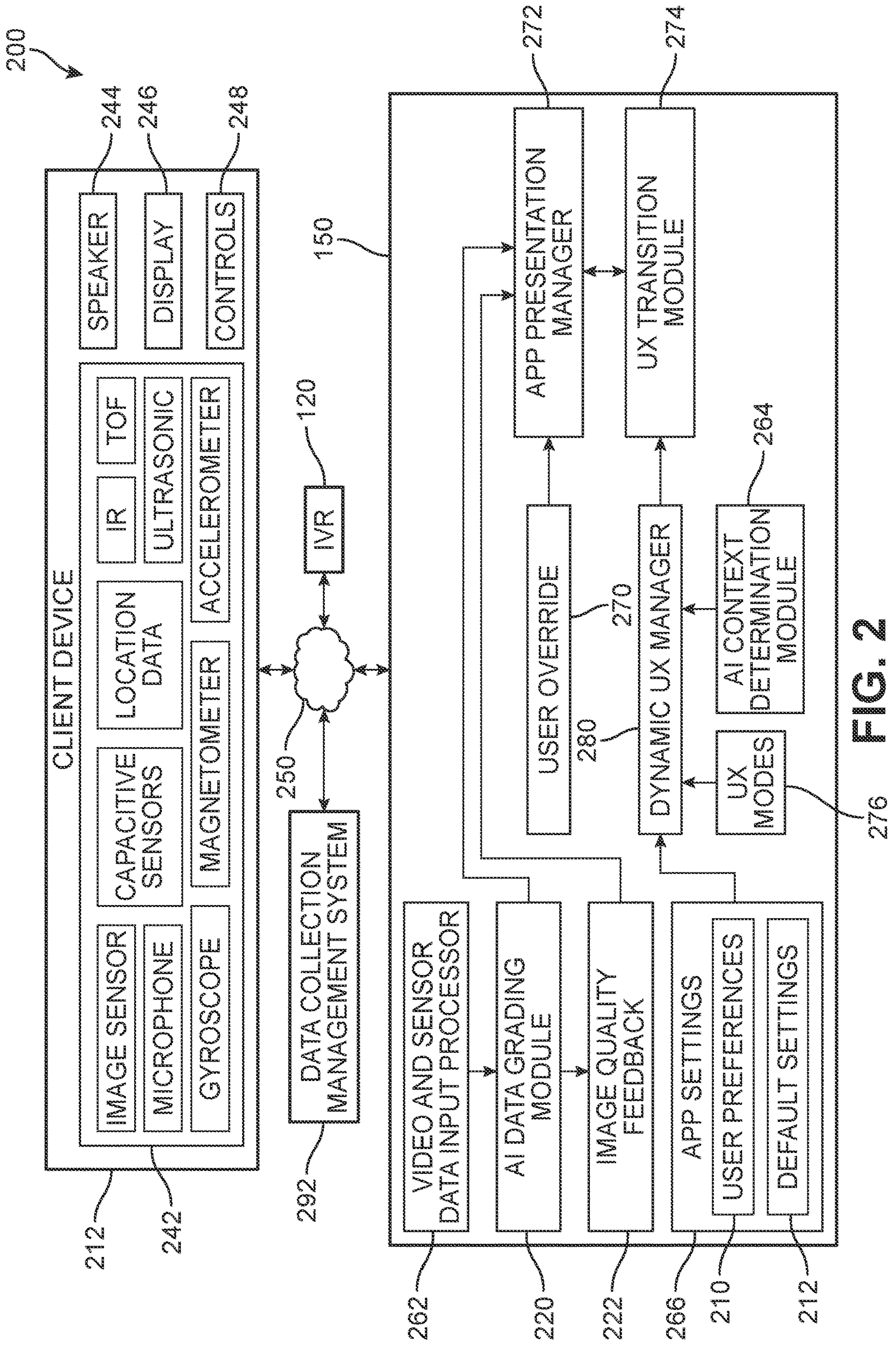
FIG. 2 is a schematic diagram of a system for automatically and dynamically transitioning between modalities in an application, according to an embodiment.

In order to provide the reader with a greater appreciation of the embodiments, FIG. 2 depicts an overview of an embodiment of a dynamic communication modality environment ("environment"). In FIG. 2, it can be seen that environment includes a client computing device ("client device") 212 that is configured to communicate with both the IVR system 120 over a telephony or computer network, and an AI system 150 over a network connection 250. While the various components of environment 200 are shown as being accessed through a cloud network and/or stored on a cloud-based server in FIG. 2, in other embodiments some or all components described herein can be reside or be stored in client device 212 and/or a remote server.

In different embodiments, the client device 212 includes a visual output (display) 246 and audio output (speaker) 244 components that can present information and media from AI system 150, as well as other output components that can be connected to or integrated with client device 212. In addition, the client device 212 includes components configured to allow the user to interact with apps on the device ("controls") 248, such as a touchscreen, mouse, voice, etc. In some embodiments, AI system 150 can represent a digital interface for a product/service support software that is associated with a provider of the product/service of interest to a customer or other user. However, in other embodiments, the AI system 150 can include or be implemented via software configured to run or be accessed via client device 212, including tele-communication software, enterprise/business software, entertainment software, educational software, database access, etc.

In different embodiments, the user can receive and send information through a user interface ("App UX") that may be presented on the client device 212. The user interface may refer to an operating system user interface or the interface of one or more software applications that may run on the client device 212, such as an app providing a front-facing interface for features of the AI system 150. Furthermore, in different embodiments, the client device 212 can include or otherwise be in communication with one or more sensor devices ("sensors") 242. Some non-limiting examples of such sensor devices 242 are depicted in FIG. 2, including image sensors, microphone or other audio sensors, capacitive sensors, motion sensors, heat sensors, location data, infrared (IR) sensors, time-of-flight (TOF) sensors, and/or ultrasonic sensors (see below), as well as gyroscopes, magnetometers, and/or accelerometers. These sensors can collect data that is used to determine factors that may be affecting the data input quality and make recommendations to correct or improve said quality (e.g., see AI data grading module 220 below).

Referring to FIG. 2, when client device 212 begins a communication session with the IVR system 120, which integrates both telephony and computer components, a user may select one or more options that answer predetermined questions and can act to direct the user to the correct department, a specific representative, or, a recording of information, and/or to the AI system 150 as appropriate. In some embodiments, the user may interact audibly with the IVR system 120 to navigate customer menus and provide context for the call, or via keypad and/or a numeric dial-pad.

As a non-limiting example, a user can indicate a "yes" answer to a communicated option by pressing "1" on a phone keypad and/or by speaking the word "yes" into a phone receiver. To apprise the user of the manner in which to respond, the IVR system 120 can communicate a manner in which the user can select one or more options. Embodiments of the present disclosure do not require such notification and can accordingly allow for selection by a combination of methods and/or means available to the user. Additionally, embodiments of the present disclosure do not limit the user to binary (e.g., "yes" or "no") selection, rather, the IVR system 120 can receive and process different and/or complex selections via, for example, IVR voice recognition. For example, the user can speak "claim submission" in to a phone receiver and IVR system 120 can subsequently recognize and process that input. Subsequent to receiving an input from a user (e.g., an answer to a question and/or a selection of an option, among other inputs), the IVR system 120 can determine a number of additional questions and/or options to communicate to the user. These inputs can be received by both the IVR system 120 and the AI system 150, in some cases simultaneously or the IVR system 120 can forward or share the user inputs with the AI system 150. In some embodiments, the AI system 150 operates as a silent observer until such time that an AI context determination module 264 determines a change in modality should occur, as described below. For example, the inputs provided by the user subsequent to additional questions and/or options can be used by the AI system 120 to determine a context of the communication, which can trigger a change in communication modality.

If the AI context determination module 264 determines that the current or most recent conversational exchange or transaction aligns with a context for which a change in modality should occur, the AI context determination module 264 can cause a dynamic UX (user experience) manager 280 to automatically initiate a modality transition. in some embodiments, the content type that the user has indicated he or she would like to share or submit can be a defining factor in selecting a context. Some non-limiting examples of contexts that, if identified by the AI context determination module 264, can correspond to trigger events include the user's selection or indication of a desire to: (a) submit some type of supporting evidence such as damaged objects and property, (b) submit a testimony or other personal account, (c) submit data for authentication (e.g., proof of identity), (d) scan documents or identification cards, (e) present some physical proof of injury to themselves, and (f) present some data that has a visual element. Thus, the selections made by the user via the IVR system 120 can be used by the AI context determination module 264 to identify whether these "triggering contexts" have occurred. The AI context determination module 264 can then send its decision to the dynamic UX manager 280.

In response, in different embodiments, the dynamic UX manager 280, based on the context identified by the AI context determination module 264, will select a UX mode from one or more pre-established UX modes 276. For example, UX modes can include video call/record person mode (e.g., for recording persons while speaking), video call/record property mode (e.g., for recording imagery of property such as homes or other buildings), scanning mode (e.g., for capturing images of documents and/or cards or other substantially 2-D physical evidence), video tour mode (e.g., for capturing features in a walkthrough), video injury submission mode (e.g., for capturing and documenting bodily injury), etc. that will be used to interact with the user via client device 212. Each of these modes will involve a switch to a video-based interface from the IVR interface, but will differ in the prompts presented to the user via app presentation manager 272. For example, scanning mode can cause the service to request the object to be placed at a particular distance and lighting from the user's camera, while video call/record person mode can cause the client device 212 to switch to a user-facing camera and prompt the user to begin speaking once their face is centered in the viewfinder. Similarly, in the record property mode the service can prompt the user to locate the property in the camera and hold the pose for several seconds to ensure a clear image, while in the video injury submission mode the service may prompt the user to present each injury one by one. In addition, each mode can recognize, based on the type of content being submitted, when the user has completed their particular content submission, and then automatically revert to the IVR interface via UX transition module 274. Thus, the dynamic UX module 280 can be configured to respond to the categorization of a user's context for the call by triggering implementation of a new modality.

Once the dynamic UX module 280 selects the appropriate modality for the context, it shares its output with a UX transition module 274, which is configured to prepare the application of the selected modality to the current content by implementing a smooth transitioning process between the current modality to the new modality. This process is shared with a communication with app presentation manager 272, which applies the new modality. In one embodiment, a user can respond to this change by selecting a user override 270, which reverts the content presentation to its previous modality. In some embodiments, the app 220 can be configured to present an alert or other message to the user for a few seconds before the transition occurs which asks if they wish to maintain the current presentation mode or a few seconds after the transition occurs which asks if they wish to revert to the previous presentation mode.

It should be appreciated that in different embodiments, user preferences 210 that may have been submitted previously can also affect the operation of the dynamic UX manager 280. For example, if the user has updated various settings regarding the implementation of the dynamic UX modality, these preferences may be stored in an app settings module 266. In some embodiments, such preferences can indicate: (a) a more specific characterization of what type of content should be displayed in a visual medium versus an audio medium, regardless of the context; (b) what type of sensor data (e.g., which sensors) may be used to monitor the user's data submission (e.g., privacy controls); and (c) what type of interface controls should be applied in different contexts (e.g., voice commands, touchscreen, mouse, etc.). Thus, it can be appreciated that in some embodiments, the user's preferences 210 can significantly affect the manner in which dynamic UX manager 280 will behave or respond. In other embodiments, a user may not select his/her preferences, or only make designations for some of the available settings. In such cases, default settings 212 can be used that will dictate how the service will be implemented. In some embodiments, the user can refuse or otherwise manually prevent these modality switches via a user override option 270, which will cause an immediate reversion or return to the communication modality of the IVR system 120.

In different embodiments, once the AI system 150 causes a switch to a video input-based modality, video data and optionally sensor data can be received from client device 212 at a data input processor ("input processor") 262. In some embodiments, various processing algorithms perform compression, artifact correction, noise reduction, color corrections, geometric corrections, imager non-uniformity correction, etc., and various processing enhancement operations on the image and/or audio content captured by sensors of the client device 212. The image processing algorithms are numerical and symbolic algorithms for the manipulation of, for example, images and video streams captured by the device camera. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms. Image processing may also include machine learning techniques that can be used to discriminate between features and to identify objects, for example via image recognition and object detection software.

Such techniques may also include, but are not limited to, machine vision algorithms that perform, among other operations, digit recognition, printed and handwritten text recognition, symbol, logo and watermark recognition, and general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework-Yolo1, Yolo2, Yolo3, and SSD.

As shown in the embodiment of FIG. 2, in some embodiments, an AI data grading module 220 may receive the video data from the input processor 262. Based on this data, the AI data grading module 220 can perform a real-time assessment of the quality of the video data. As a general matter, image encompasses multiple factors, including but not limited to: contrast, blur, noise, artifacts, and distortion. In different embodiments, the image quality assessment (IQA) can performed by the AI data grading module 220 can be based on the generation of one or more image quality scores that are used to indicate the reliability of the received image data. For example, if the received image is blurred, vague, disoriented, of low resolution, and/or the like, the image may not be reliable for submission to a service provider's data collection management system 292 (e.g., claims processing database, etc.).

In one example, an image quality score may be a general numeric score based on a plurality of sub-scores, e.g., a weighted sum of sub-scores. In another implementation, the AI data grading module 220 may determine whether the image is acceptable based on a hierarchical algorithm which generates image scores at different stages of the algorithm. For example, in one implementation, upon receiving an image, the AI data grading module 220 may perform a first order inspection of the image, e.g., to determine an image contrast score, or a source of the image, etc. If the first order AI inspector determines the received image is unacceptable, e.g., the image contrast score is lower than a minimum threshold, the image may be rejected without further inspection.

In another embodiment, if the AI data grading module 220 determines the image quality score is unacceptable, the AI data grading module 220 may reject the image and send a signal to the app presentation manager 272 to alert the user that the image failed to meet standard image quality guidelines. For example, the user may receive a message via a user interface displaying "Sorry! It looks like the image of your injury was not clear. Let's try again." The user may then elect to re-capture an image, or exit the process. In another example, if the AI data grading module 220 determines the image quality score is acceptable, for example by exceeding a general image quality score threshold, the AI data grading module 220 may proceed to process the image to extract any information, allow the user to continue recording, and/or submit the information to the data collection management system 292 for storage and processing.

In different embodiments, the AI data grading module 220 may evaluate a plurality of image quality scores. For example, the AI data grading module 220 may calculate an image contrast score, such as an image contrast ratio of the luminance of the brightest color of the image to that of the darkest color of the image, an image contrast ratio of the grayscale values of the lightest color to that of the darkest color, etc. In one example, In one implementation, the contrast ratio may be a numeric value between 0 and 1, and the closer the contrast ratio is to 1, which indicates the darkest pixel and the lightest pixel values are proximate, the poorer the contrast performance the image has. For example, a contrast ratio greater than 0.15 may be considered as having poor image contrast, and the image may be rejected.

In some embodiments, the AI data grading module 220 may perform OCR on the image to calculate a MICR OCR score and/or a CAR OCR score, particularly in cases where the UX mode selected is scanning of documents or other objects with writing. For example, the OCR may be implemented via a Java OCR API library, e.g., Asprise OCR SKD v4.o, JavaOCR, and/or the like. In one example, the MICR OCR score may be generated by counting a number of legible characters in the MICR line and calculating a percentage of the legible characters out of the total number of characters in the MICR line. As another example, the CAR OCR score may be generated by counting a number of legible digits and calculating a percentage of the legible digits out of the total number of digits. For example, the MICR OCR score may be a percentage value between 0 and 1, and the AI data grading module 220 may request at least a 60% or 70% MICR OCR readability. In yet another example, the MICR OCR score and the CAR OCR score may be generated based on a confidence level during the OCR process. For example, the MICR OCR readability thresholds may depend on the contrast level.

In some embodiments, the AI data grading module 220 may generate a histogram score of the received image. For example, the AI data grading module 220 may convert the received scanned document or card image into a grayscale image, and generate a histogram of the grayscale image. The AI data grading module 220 may then calculate an average value of the histogram and determine whether the image is "good" based on heuristics, e.g., the mean of the histogram should be about the same for most driver's licenses or medical insurance cards; bad images may either be too light or too dark so the mean value will be out of range to produce a lower score. In one implementation, the AI data grading module 220 may calculate the histogram score as a deviation to the statistical average mean value of histogram of "good" images.

In different embodiments, the AI data grading module 220 may calculate a general image quality score based on multiple sub-scores, each sub-score representing a factor of image quality. Scores may be compared with a related minimum image quality threshold to determine whether the received image meets with the minimum requirement. For example, the received image may need to meet a minimum contrast level to be performed with OCR to extract information. Such thresholds may be pre-determined by an AI data grading module 220 operator. In an alternative embodiment, the image quality thresholds may be dynamically determined and updated based on heuristics of previous image assessment. For example, the AI data grading module 220 may determine different thresholds for images obtained via different image capture devices (e.g., scanner, camera, cellular phone, etc.). In other embodiments, the AI data grading module 220 can apply other learning-based approaches that include machine learning models, including deep learning, to automate IQA and provide fast inference.

In some embodiments, in cases where the AI system 150 determines the image data quality is not acceptable, an optional image quality feedback module 222 can, based in part on sensor data received from client device 212, identify specific actions that might be taken by the user to improve image quality. For example, if the gyroscope and/or accelerometer data indicates the client device 212 was physically moving in an unsteady or jerky pattern, the image quality feedback module 222 can generate personalized recommendations to the user via app presentation manager 272 that suggest the user attempt to steady their device while recording the video. In another example, if the infrared sensor or image sensor indicates lighting is poor around the client device 212, the image quality feedback module 222 can generate personalized recommendations to the user via app presentation manager 272 that suggest the user move to an area with better lighting or activate their device light. In yet another example, if the microphone data indicates heavy or haphazard ambient noise, the image quality feedback module 222 can generate personalized recommendations to the user via app presentation manager 272 that suggest the user attempt to find a quieter place to record their audio testimony. In one example, if network data indicates the user has a poor network connection, image quality feedback module 222 can generate personalized recommendations to the user via app presentation manager 272 that suggest the user join a local network (such as Wi-Fi) or make the video recording at a later time. In still another example, if location data indicates the user is far from the property that is being claimed as damaged, image quality feedback module 222 can generate personalized recommendations to the user via app presentation manager 272 that suggest the user wait to engage in video recording until they have arrived at the target property. In another example, if Time of Flight data indicates the object is too far for the resolution of the device camera, the image quality feedback module 222 can generate personalized recommendations to the user via app presentation manager 272 that suggest the user move closer to the object.

It should be understood that in other implementations, environment can include additional or fewer modules or can include one or more additional computing devices or related server devices. The modules of environment can be associated with the various local computing devices and, for example, can be disposed within the computing device. In alternative implementations, the modules of environment can include independent computing devices that are coupled to, and in data communication with, the local computing devices. As used in this description, the term "module" is intended to include, but is not limited to, one or more computers, processing units, or devices configured to execute one or more software programs that include program code that causes a processing device(s) or unit(s) of the computer to execute one or more functions. Processing units can include one or more processors (e.g., microprocessors or central processing units (CPUs)), graphics processing units (GPUs), application specific integrated circuits (ASICs), or a combination of different processors.

In alternative embodiments, systems and modules can each include other computing resources/devices (e.g., cloud-based servers) that provide additional processing options for performing one or more of the machine learning determinations and calculations. The processing units or devices can further include one or more memory units or memory banks. In some implementations, the processing units execute programmed instructions stored in memory to cause system, devices, and modules to perform one or more functions described herein. The memory units/banks can include one or more non-transitory machine-readable storage mediums. The non-transitory machine-readable storage medium can include solid-state memory, magnetic disk, and optical disk, a random-access memory (RAM), a read-only memory (ROM), an erasable programmable read-only memory (e.g., EPROM, EEPROM, or Flash memory), or any other tangible medium capable of storing information.

Figure 3:
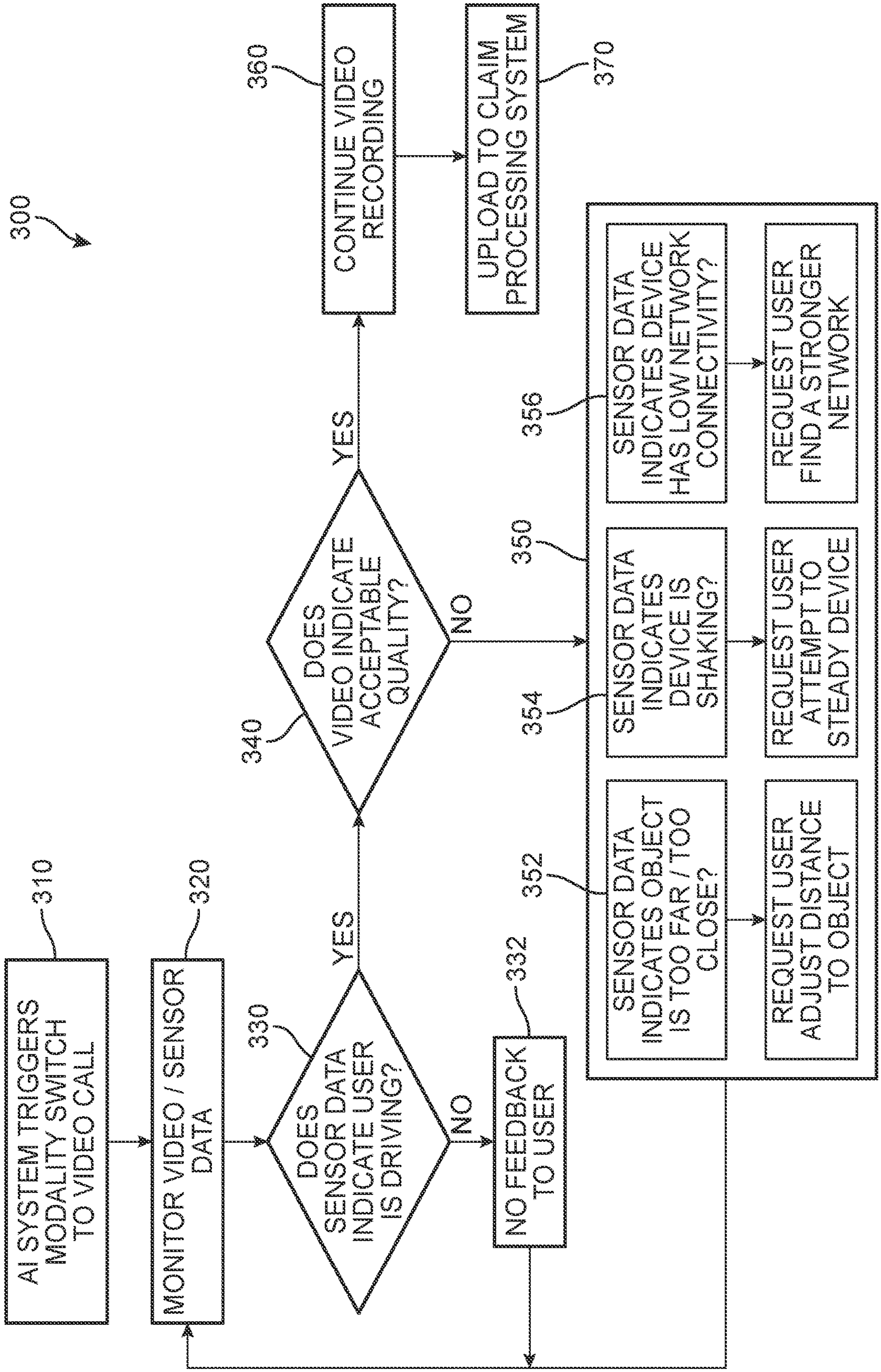
FIG. 3 is a flow diagram showing a process of performing image quality assessment before acceptance of data for submission to a service provider system, according to an embodiment.

Referring now to FIG. 3, a flow diagram depicts an embodiment of intelligent user data submission supported by an AI system. In a first stage 310, the AI system triggers a switch from the IVR system to the video-based interface. In a second stage 320, the AI system monitors the incoming video data and, optionally, sensor data from the user's device. In a third stage 330, the AI system identifies whether the currently incoming video/audio data is intended for submission to a service provider data collection system. If the data is superfluous (e.g., the user is moving from one place to another, or is not yet directing their attention to the video call) the AI system will refrain from providing feedback regarding image quality, though it may prompt the user to indicate when they are formally presenting information for submission to the system by selection of an option shown on their device screen or a verbal notification. If the input provided by the user is being captured for purposes of submission, the AI system can assess the quality of the images in a fourth stage 340. For example, as discussed earlier, the AI system can review the data across multiple quality scoring modules 850, such as a first module 852 in which the AI system determines whether the object is too far or too close (e.g., based on user device sensor data) and generating feedback for presentation to the user that the user adjust their distance to/from the object, a second module 854 in which the AI system determines the camera is moving too much or shaking (e.g., based on user device sensor data) and generating feedback for presentation to the user that the user attempt to steady their device, and a third module 856 in which the AI system determines the user's device has insufficient network strength for submitting quality video (e.g., based on user device sensor data) and generating feedback for presentation to the user that the user find a better network or one that permits greater bandwidth. If on the other hand the image quality is higher than the established threshold, the AI system will continue to record the video in a fifth stage 860. Once the user has completed their submission, this data can be uploaded or shared with the designated recipient system associated with the service provider, such as a claims processing system, in a sixth stage 870.

Figure 4A:
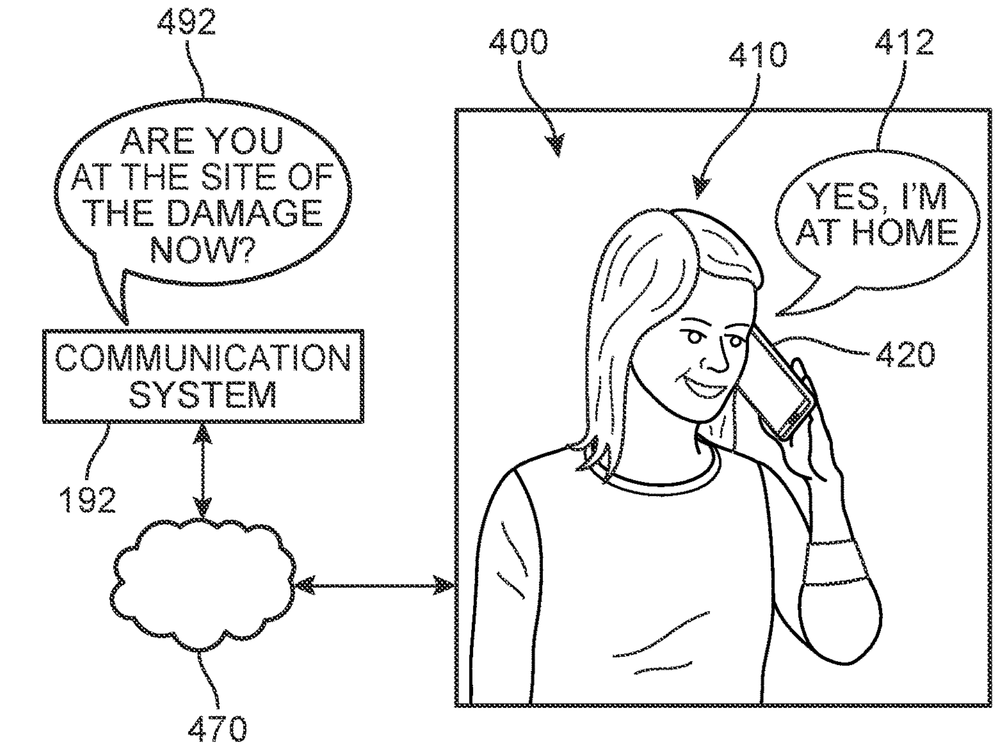
FIGS. 4A-4C are a sequence illustrating a scenario in which an end-user provides a response that corresponds to a triggering event for an AI system to cause a switch in modality for communication, according to an embodiment.
Figure 4B:
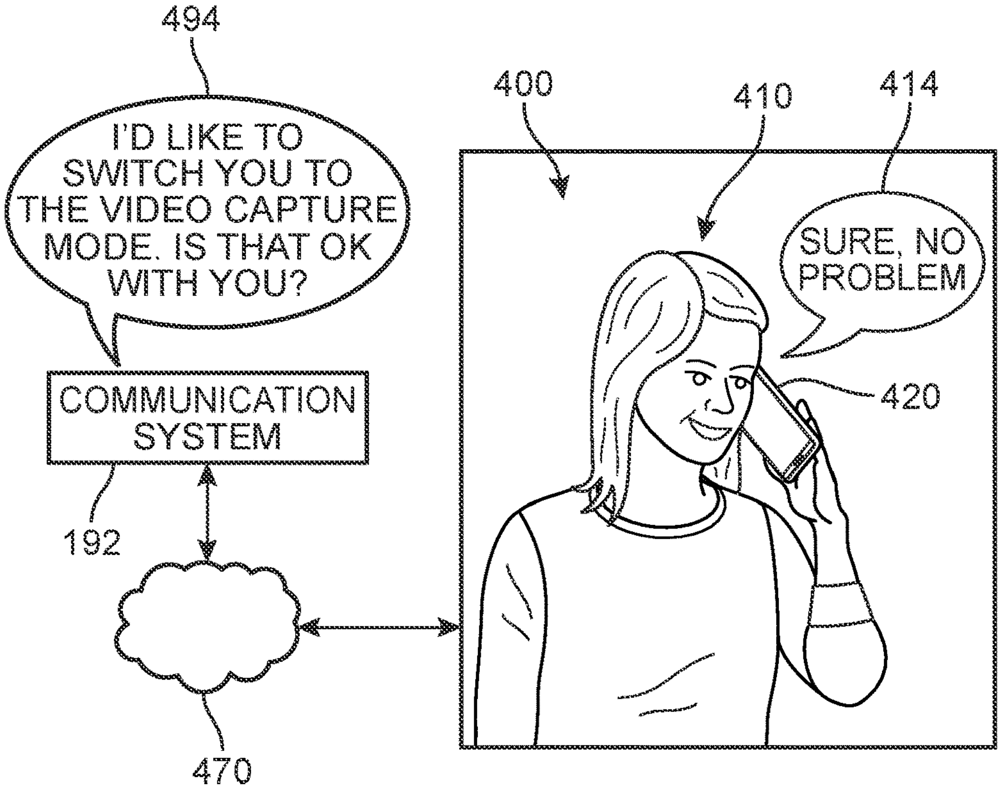
Figure 4C:
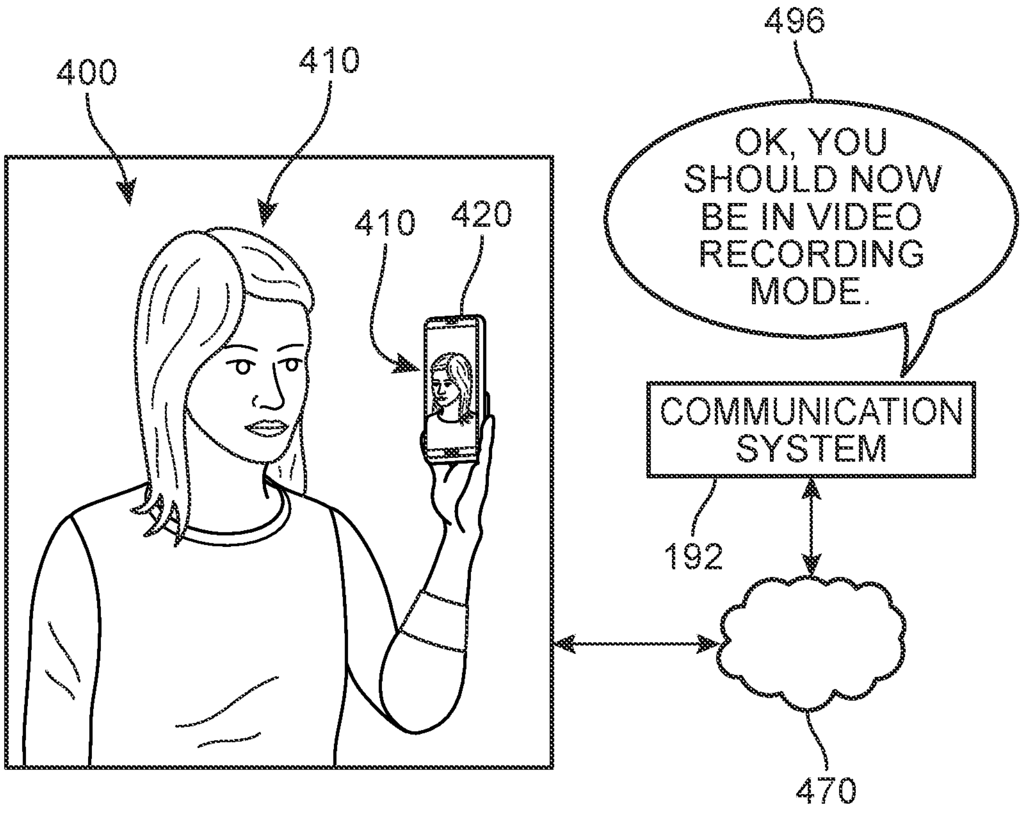

Referring now to FIGS. 4A-4C, an example of a scenario in which a first user 310 engages with an embodiment of the communication system 192 is depicted. In FIG. 4A, at a first time, the first user 410 is interacting with the service provider via the IVR system of the communication system 192 while in a first physical location, such as a dining room of her home 400. The first user 410 is speaking or otherwise interacting with the IVR prompts via her mobile device 420. In this example, the IVR system presents a first prompt 492 ("Are you at the site of the damage now?") and the first user 410 provides a first response 412 ("Yes, I'm at home"). The exchange can be transmitted over a network 470 (telephony or data).

At a subsequent second time, shown in FIG. 4B, the AI system determines, based on the preceding sequence of inputs by the user, that she can submit video data (e.g., to offer testimony and evidence in support of an insurance claim for damage to her property). The IVR system presents a second prompt 494 ("I'd like to switch you to video capture mode. Is that OK with you?"), requesting permission from the user before triggering the automatic modality switch, and the first user 420 provides a second response 414 ("Sure, no problem") expressing her consent. In FIG. 4C, a third time (subsequent to the second time) is depicted where the AI system of the communication system 192 has automatically switched communication interfaces to enable video recording. In this case, a front-facing camera is activated to allow for the device to capture the user's face, which is then displayed on a user interface 422 on the screen of the mobile device 420. The AI system presents a first message 496 confirming the switch ("OK, you should now be in video recording mode").

Figure 5:
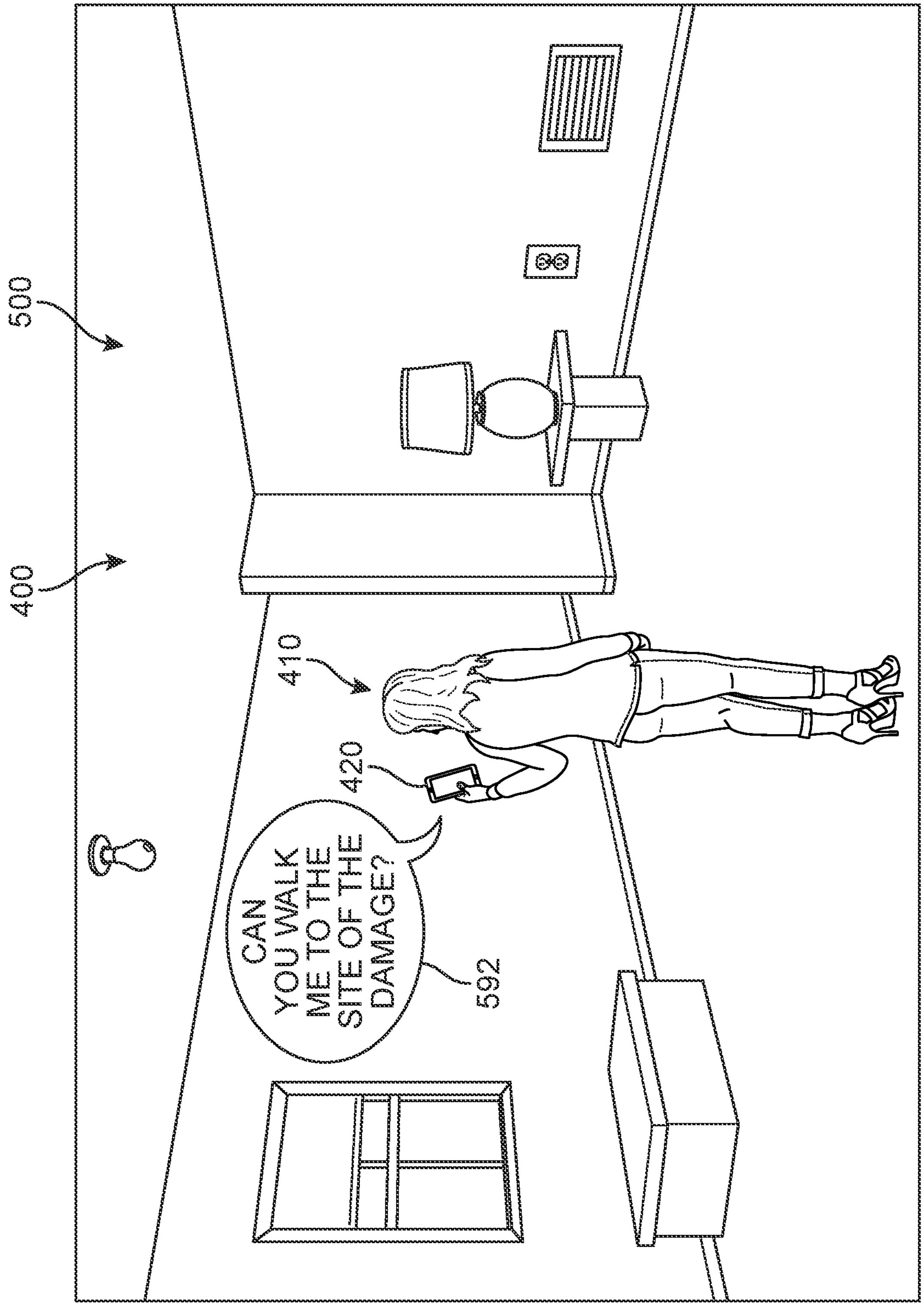
FIGS. 5 and 6 show the end-user moving to the target location and capturing video data via the AI-enabled video interface, according to an embodiment.
Figure 6:
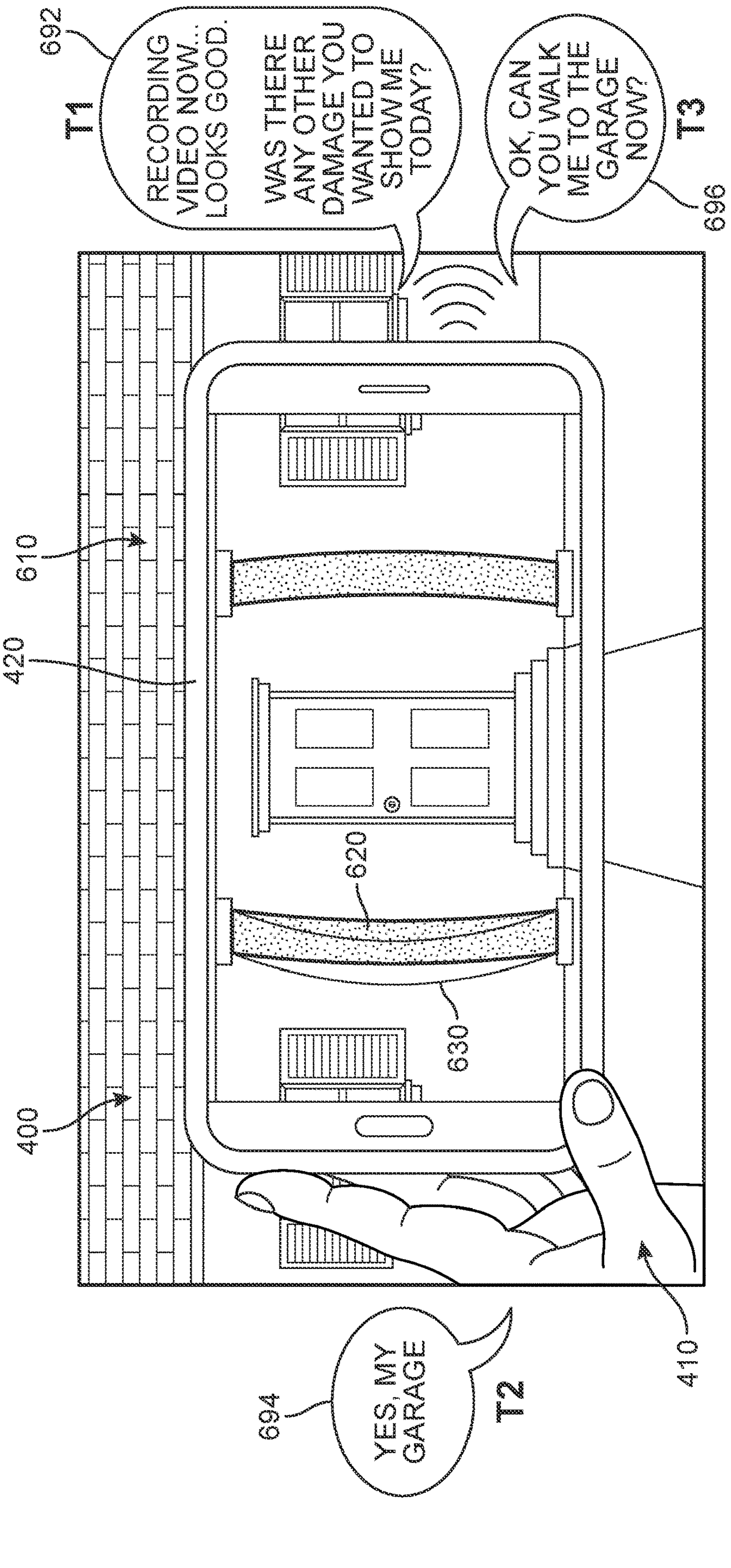

In different embodiments, the first user 410 may begin speaking directly to the camera for purposes of data collection. In another example, the submission can involve image-based evidence of the damage that was purportedly caused to her property. FIG. 5 shows the first user 410 with the mobile device 420 in video recording mode being asked by the AI system in a second message 592 ("Can you walk me to the site of the damage?") to move from her current location 500 (e.g., the dining room) in her home 400 to the damaged portion of the property in anticipation of recording said damage. The first user 410 has gone outside in FIG. 6, and is standing in front of her home 400 facing a front portion 610 of the structure, where the rear facing camera of the mobile device 420 is now capturing data, with a preview shown on a display of the mobile device 420. The AI system presents a third message 692 at a first time T1 confirming the video is being captured and received, and then asking if additional data was to be provided ("Recording video now . . . Looks good. Was there any other damage you wanted to show me today?"). The first user 410 inputs a third response 694 at a second time T2, indicating her desire to record more data ("Yes, my garage"). The AI system then presents a fourth message 696 at a third time T3, asking that the user move to the position that allows capture of the desired target ("OK, can you walk me to the garage now?").

Figure 7:
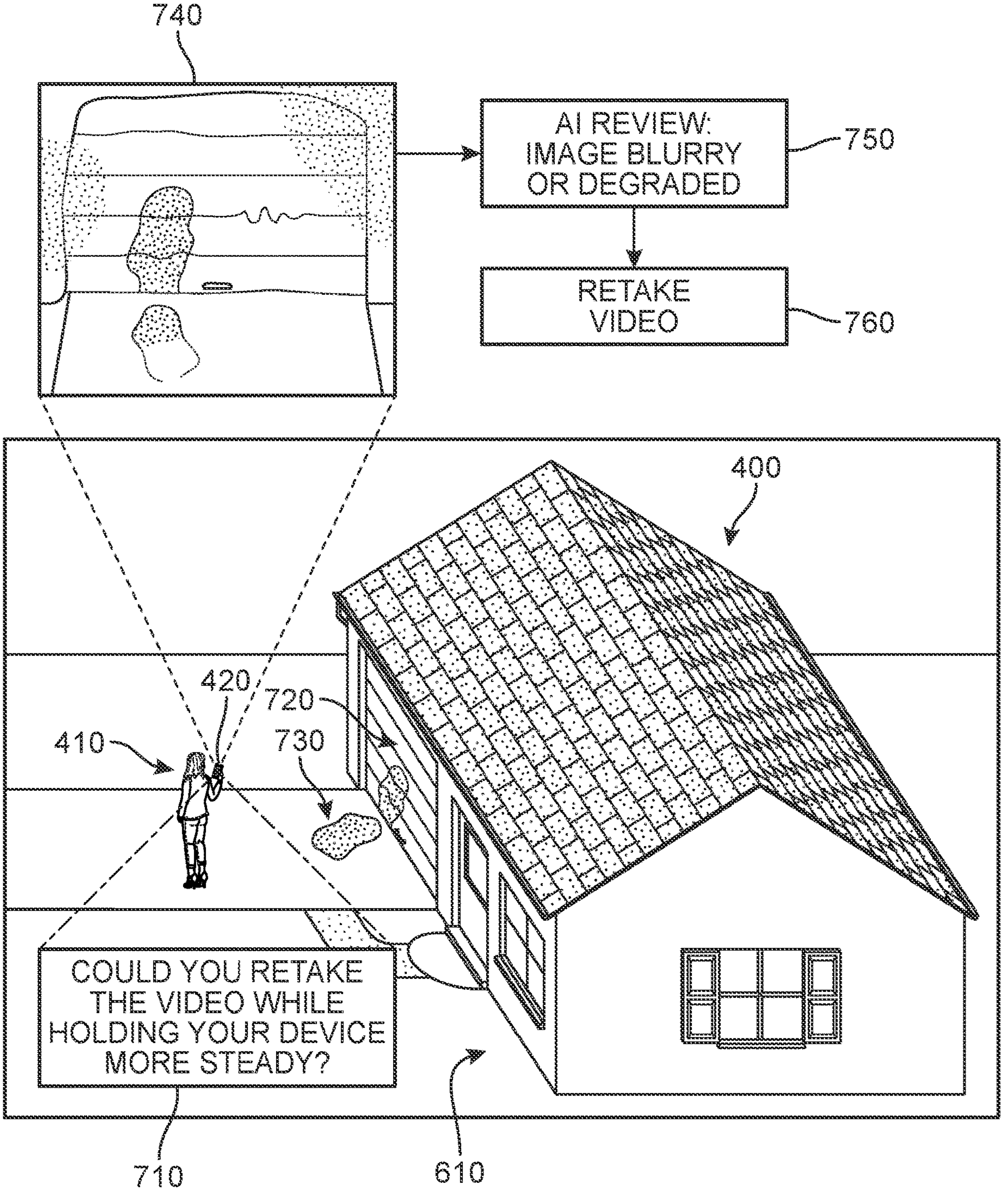
FIGS. 7 and 8 show an example of the AI system providing feedback for the image quality of the captured video data and initiating a re-take of the video data, according to an embodiment.
Figure 8:
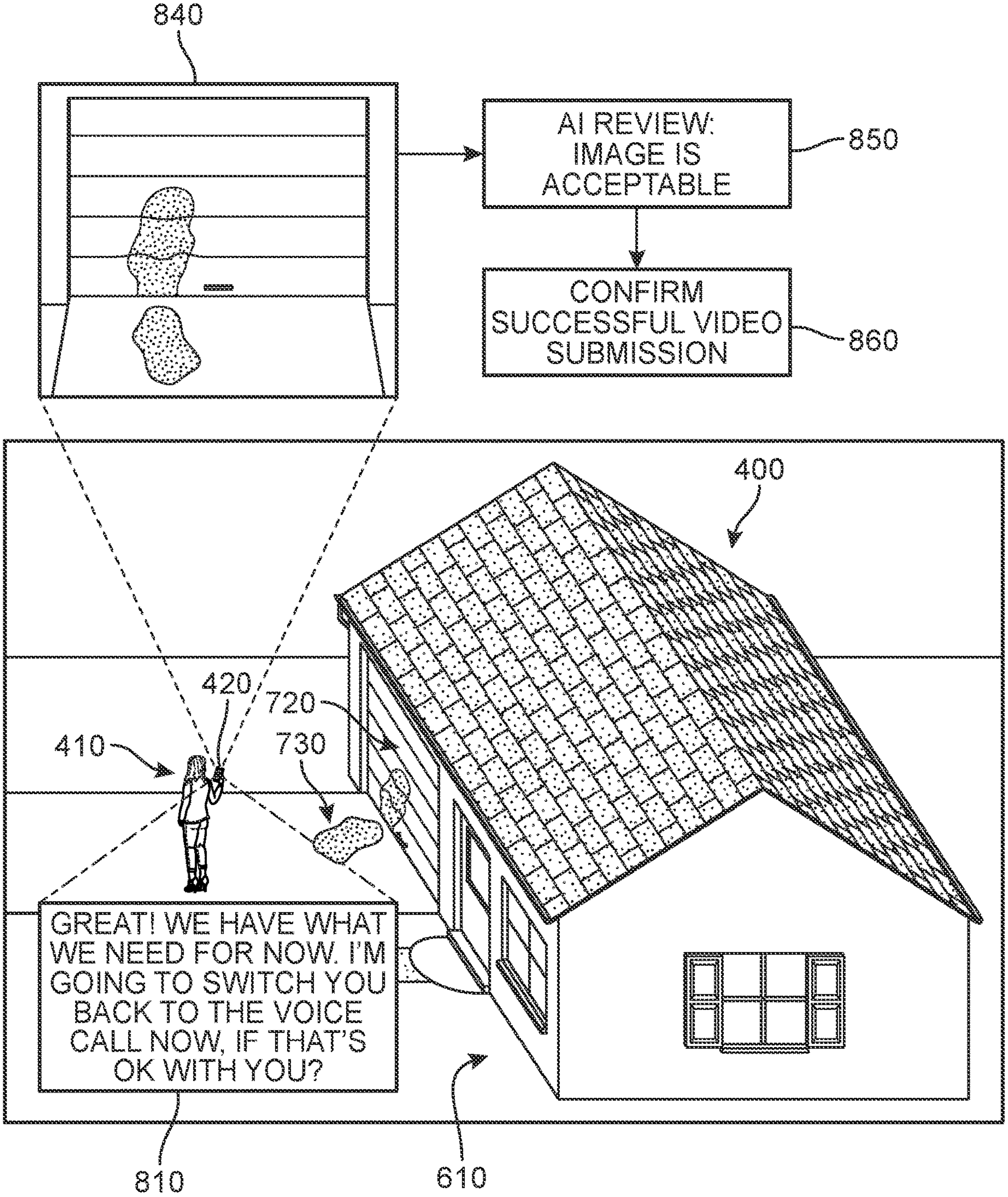

As noted earlier, in different embodiments, the AI system is configured to assess the image quality of the captured video/images in real-time and provide feedback as appropriate. One example is shown in the sequence of FIGS. 7 and 8, where the first user 410 is now positioned outside her home 400 and facing her garage 720 which has indications of damage 730. The first user 410 begins to record video using her mobile device 420, which is received by the AI system as first image data 740. In an operation 750, the AI system performs an image quality assessment and determines the image is too blurry or otherwise degraded and therefore not acceptable for submission. The AI system then presents a feedback message ("Could you retake the video while holding your device more steady?") asking the first user to re-take the video in an operation 760. In FIG. 8, the first user 410 steadies her mobile device 420 as she captures second video data 840 of the garage 720. In this case, the AI system affirms that the image quality is acceptable in an operation 850, and can submit the data to the service provider system in an operation 860. The AI system can then determine that the user has provided the required or intended data and automatically shift or transition back to the IVR system, for example following presentation of a completion message 810 ("Great! We have what we need for now. I'm going to switch you back to the voice call now, if that's OK with you?"). If the user agrees, the AI system can cause an automatic return to the IVR-based communication interface.

Figure 9:
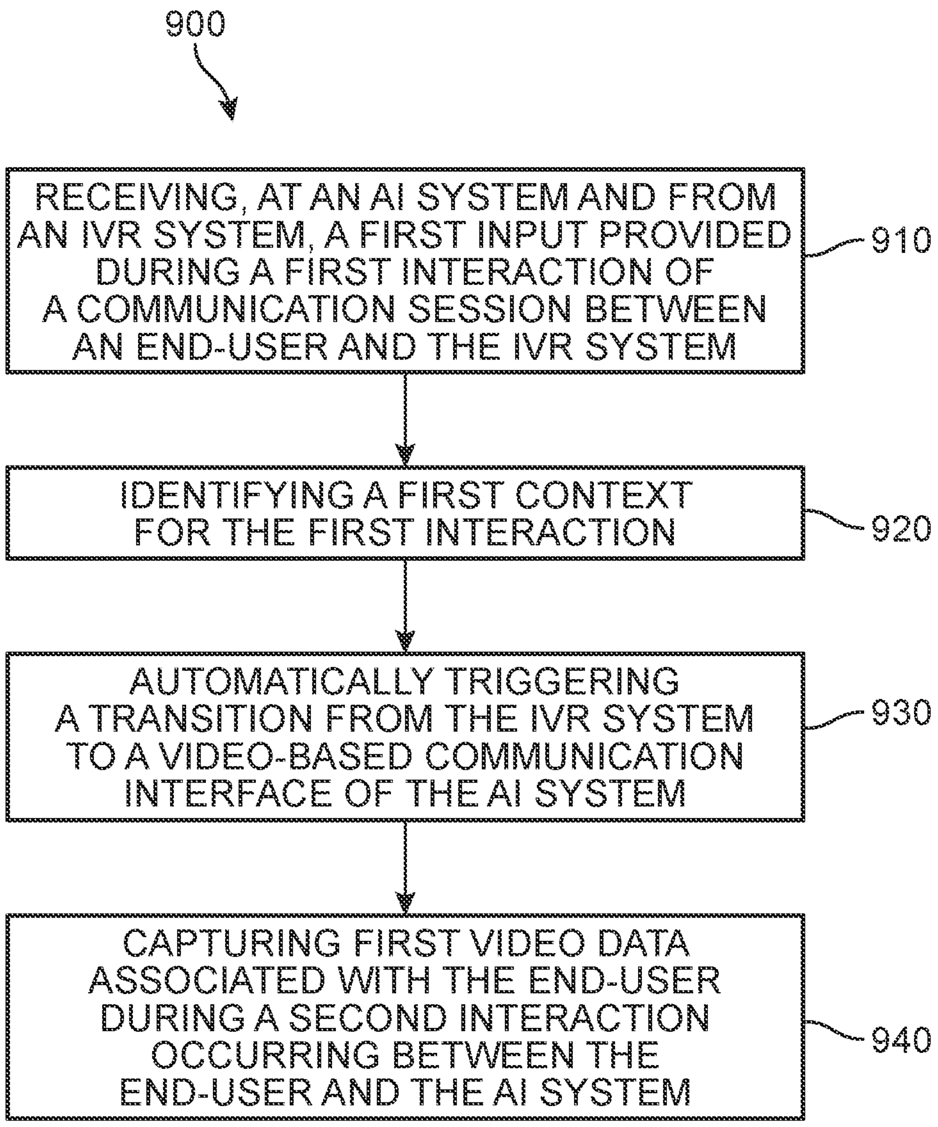
FIG. 9 is a flow chart of a process for performing dynamically responsive transitions between modalities during a communication session, according to an embodiment.

FIG. 9 is a flow chart illustrating an embodiment of a method 900 of dynamically transitioning between communication modalities during a communication session with an end-user. The method 900 includes a first step 910 of receiving, at an artificial intelligence (AI) system and from an interactive voice response (IVR) system, a first input by the end-user from a user computing device during a first interaction of the communication session, the first interaction occurring between the end-user and the IVR system. A second step 920 includes identifying, at the AI system and based on the first input, a first context for the first interaction. In addition, a third step 930 includes automatically triggering, at the AI system and in response to the identification of the first context, a transition of management of the communication session from the IVR system to a video-based communication interface of the AI system, e.g., thereby changing the medium in which the content is being received by the computing device from audio to video. The transition can occur, for example, in response to the detected context. A fifth step 940 includes capturing, by the AI system, first video data associated with the end-user from the user computing device during a second interaction occurring between the end-user and the AI system, as a result of the switch/transition.

In other embodiments, the method may include additional steps or aspects. In one embodiment, the method can also include determining, at the AI system, that the second interaction has been successfully completed and in response automatically reverting management of the communication session to the IVR system. In another example, the method also includes determining, at the AI system, the first video data falls below an image quality scoring threshold and in response requesting the end-user provide second video data to replace the first video data. In some embodiments, the first context is identified in part based on a recognition by the AI system of a type of input that is intended for submission by the end-user. For example, the type of input can include one of a personal testimony, evidence of property damage, evidence of bodily injury, and images of documents.

In some embodiments, the method also includes steps of grading, by the AI system, an image quality of the first video data; generating, at the AI system, an image quality score; and comparing the image quality score with a pre-established image quality scoring threshold in order to determine whether the first video data has a sufficient image quality to be considered acceptable for submission to the service provider system. In one embodiment, the method also includes steps of receiving, from the user computing device and at the AI system, first sensor data; determining, based on the first sensor data, a first action that has a high likelihood of improving image quality; and presenting, at the user computing device, the first action as a recommendation to the end-user.

Furthermore, in some embodiments, the method can also involve steps of receiving, at the IVR system, a second input by the end-user during a third interaction of the communication session; identifying, at the AI system and based on the second input, a second context for the third interaction; and automatically triggering, at the AI system and in response to the identification of the second context, another transition of management of the communication session from the IVR system to the AI system. In another example, the method may further include steps of receiving, at the IVR system, a second input by the end-user during a third interaction of the communication session; identifying, at the AI system and based on the second input, a second context for the third interaction; and maintaining, by the AI system and in response to the identification of the second context, a current modality for the communication session based on the second context not matching one of the designated contexts requiring video capture.

Other methods can also be contemplated within the scope of this disclosure. For example, a method of dynamically transitioning between communication modalities during a communication session with an end-user is disclosed. The method includes a first step of receiving, at an artificial intelligence (AI) system, first video data associated with the end-user from a user computing device during a first interaction of the communication session, a second step of determining, at the AI system, that the first interaction has been successfully completed, and a third step of automatically reverting management of the communication session to an interactive voice response (IVR) system in response to determining the first interaction has been successfully completed. Thus, the AI system causes a switch from a first modality (video interface) to a second modality (IVR interface), thereby changing the medium in which the content is being presented and/or received by the computing device.

In different embodiments, this method may include additional steps or aspects. In one embodiment, the method also includes steps of grading, by the AI system, an image quality of the first video data; generating, at the AI system, an image quality score for the first video data based on the grading; and determining the image quality score exceeds a pre-established image quality scoring threshold, where determining the first interaction has been successfully completed is based on the image quality score exceeding the image quality scoring threshold. In one example, the IVR system excludes video capture and the AI system enables image capture.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANS (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of dynamically transitioning between communication modalities during a communication session with an end-user, the method comprising:

receiving, at an artificial intelligence (AI) system and from an interactive voice response (IVR) system, a first input by the end-user from a user computing device during a first interaction of the communication session, the first interaction occurring between the end-user and the IVR system;

identifying, at the AI system and based on the first input, a first context for the first interaction;

automatically triggering, at the AI system and in response to the identification of the first context, a transition of management of the communication session from the IVR system to a video-based communication interface of the AI system;

receiving, by the AI system, first video data from the user computing device during a second interaction occurring between the end-user and the AI system;

receiving, by the AI system, first sensor data collected via a first onboard sensor of the user computing device during the second interaction, the first onboard sensor including one or more of a gyroscope, accelerometer, capacitive sensor, magnetometer, infrared sensor, microphone, network connectivity sensor, location sensor, Time-of-Flight (TOF) sensor;

determining, at the AI system, the first video data is unacceptable based on an image quality assessment (IQA) of the first video data performed by the AI system; and identifying and presenting, by the AI system and based on the first sensor data, a first action that can be taken by the end-user to improve image quality.

2. The method of claim 1, further comprising determining, at the AI system, that the second interaction has been successfully completed and in response automatically reverting management of the communication session to the IVR system.

3. The method of claim 2, further comprising:

receiving, at the IVR system, a second input by the end-user during a third interaction of the communication session;

identifying, at the AI system and based on the second input, a second context for the third interaction; and automatically triggering, at the AI system and in response to the identification of the second context, another transition of management of the communication session from the IVR system to the AI system.

4. The method of claim 2, further comprising:

receiving, at the IVR system, a second input by the end-user during a third interaction of the communication session;

identifying, at the AI system and based on the second input, a second context for the third interaction; and maintaining, by the AI system and in response to the identification of the second context, a current modality for the communication session.

5. The method of claim 1, wherein the first action includes requesting the end-user provide second video data to replace the first video data while moving to an area with better lighting or activating their device light.

6. The method of claim 1, wherein the first context is identified in part based on a recognition by the AI system of a type of input that is intended for submission by the end-user.

7. The method of claim 6, wherein the type of input can include one of a personal testimony, evidence of property damage, evidence of bodily injury, and images of documents.

8. The method of claim 1, wherein performance of the IQA further comprises:

generating, at the AI system, an image quality score for the first video data by inspecting one or more of an image contrast ratio and an average value of a histogram of the first video data; and comparing the image quality score with a pre-established image quality scoring threshold.

9. The method of claim 1, further comprising identifying, based on the first sensor data and by the AI system, a first action that has a high likelihood of improving image quality, the first action including one of a steadying of the user computing device, using improved lighting, reducing ambient noise, and moving closer to an object.

10. A system for dynamically transitioning between communication modalities during a communication session with an end-user, the system comprising a processor and machine-readable media including instructions which, when executed by the processor, cause the processor to:

receive, at an artificial intelligence (AI) system and from an interactive voice response (IVR) system, a first input by the end-user from a user computing device during a first interaction of the communication session, the first interaction occurring between the end-user and the IVR system;

identify, at the AI system and based on the first input, a first context for the first interaction;

automatically trigger, at the AI system and in response to the identification of the first context, a transition of management of the communication session from the IVR system to a video-based communication interface of the AI system;

receive, by the AI system, first video data from the user computing device during a second interaction occurring between the end-user and the AI system;

receive, by the AI system, first sensor data collected via a first onboard sensor of the user computing device during the second interaction, the first onboard sensor including one or more of a gyroscope, accelerometer, capacitive sensor, magnetometer, infrared sensor, microphone, network connectivity sensor, location sensor, Time-of-Flight (TOF) sensor;

determine, at the AI system, the first video data is unacceptable based on an image quality assessment (IQA) of the first video data performed by the AI system; and identify and present, by the AI system and based on the first sensor data, a first action that can be taken by the end-user to improve image quality.

11. The system of claim 10, wherein the instructions further cause the processor to determine, at the AI system, that the second interaction has been successfully completed and in response automatically reverting management of the communication session to the IVR system.

12. The system of claim 11, wherein the instructions further cause the processor to:

receive, at the IVR system, a second input by the end-user during a third interaction of the communication session;

identify, at the AI system and based on the second input, a second context for the third interaction; and automatically trigger, at the AI system and in response to the identification of the second context, another transition of management of the communication session from the IVR system to the AI system.

13. The system of claim 11, wherein the instructions further cause the processor to:

receive, at the IVR system, a second input by the end-user during a third interaction of the communication session;

identify, at the AI system and based on the second input, a second context for the third interaction; and maintain, by the AI system and in response to the identification of the second context, a current modality for the communication session.

14. The system of claim 10, wherein the first action includes requesting the end-user provide second video data to replace the first video data while moving to an area with better lighting or activating their device light.

15. The system of claim 10, wherein the first context is identified in part based on a recognition by the AI system of a type of input that is intended for submission by the end-user.

16. The system of claim 15, wherein the type of input can include one of a personal testimony, evidence of property damage, evidence of bodily injury, and images of documents.

17. The system of claim 10, wherein performance of the IQA further causes the processor to:

generate, at the AI system, an image quality score for the first video data by inspecting one or more of an image contrast ratio and an average value of a histogram of the first video data; and compare the image quality score with a pre-established image quality scoring threshold.

18. The system of claim 10, wherein the instructions further cause the processor to identify, based on the first sensor data and by the AI system, a first action that has a high likelihood of improving image quality, the first action including one of a steadying of the user computing device, using improved lighting, reducing ambient noise, and moving closer to an object.

19. The system of claim 10, wherein the first onboard sensor is a gyroscope and the instructions further cause the processor to identify the first action based on the first sensor data indicating the user computing device was physically moving in an unsteady or jerky pattern.

20. The system of claim 10, wherein the instructions further cause the processor to identify the first action based on the first sensor data indicating there is insufficient network strength for submitting quality video to the AI system.

* * * * *